June 26, 1962     G. EISENMAN ET AL     3,041,252
GLASS ELECTRODE FOR MEASURING POTASSIUM ION
Filed Nov. 19, 1959
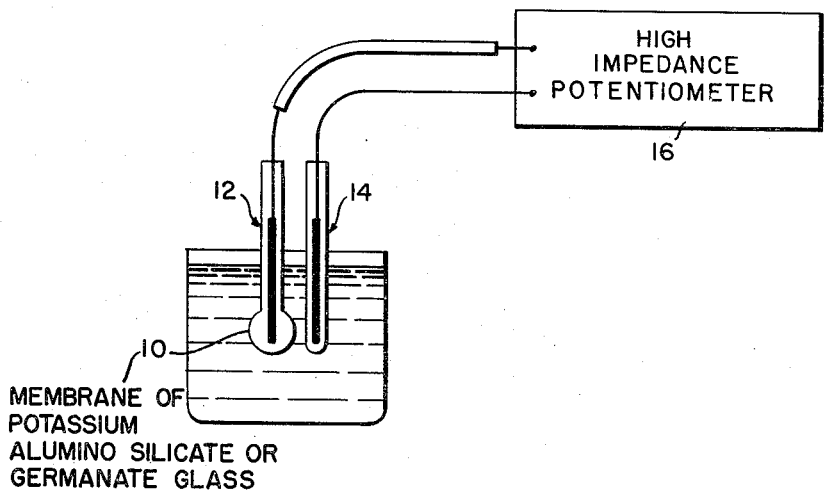
INVENTORS.
GEORGE EISEMAN
DONALD O. RUDIN
JAMES U. CASBY
BY Max R. Millman
ATTORNEY.

United States Patent Office 3,041,252
Patented June 26, 1962

3,041,252
GLASS ELECTRODE FOR MEASURING POTASSIUM ION
George Eisenman, Gladwyne, and Donald O. Rudin and James U. Casby, Philadelphia, Pa., assignors to Commonwealth Mental Health Research Foundation, a corporation of Pennsylvania
Filed Nov. 19, 1959, Ser. No. 854,154
6 Claims. (Cl. 204—1)

This invention relates to glass electrodes for measuring $K^+$ activity in the presence of $Na^+$ and other cations over a wide range of pH.

In our Patent No. 2,829,090, we disclose that alkali oxide-silica glass electrodes containing more than a fraction of a mole percent $Al_2O_3$ are markedly cation sensitive and that electrodes made of soda alumina silicates wherein the ratio of the mole percent of $Al_2O_3$ to $Na_2O$ is at least substantially 1:1 are of practical utility in selectively measuring $Na^+$ activity in the presence of $K^+$ and $H^+$ and other cations.

Also in said patent we disclose that certain soda alumina silicates in which the mole percent of $Na_2O$ is equal to or greater than twice the sum of the mole percent of $Al_2O_3$ and 6.25 mole percent are more sensitive to $K^+$ than $Na^+$ and hence when used in conjunction with a highly selective $Na^+$ electrode, both $Na^+$ and $K^+$ activities of an unknown solution can be measured.

This invention is an extension of and improvement over the aforementioned disclosure and is based on the discovery that glass compositions containing potassium oxide, aluminum oxide and a network or glass forming oxide, such as silicon dioxide or germanium dioxide, in which the ratio of the mole percent of $K_2O$ to $Al_2O_3$ as determined by chemical analysis of the fused glass is at least substantially 1.5 to 1 are more sensitive to $K^+$ than to $Na^+$. Within limits, as the ratio increases the sensitivity to $K^+$ increases. Thus, for example, where the ratio of $K_2O$ to $Al_2O_3$ is substantially 2 to 1, the composition is approximately 5 times as sensitive to $K^+$ as to $Na^+$. Also, glasses in which the alkali oxide is rubidium or cesium oxide are all more sensitive to $K^+$ than to $Na^+$.

Glass electrodes made of the aforementioned compositions may be employed as such to determine $K^+$ activity or in certain cases should be used in conjunction with a determination of the $Na^+$ activity. Electrodes more than 5 times more sensitive to $K^+$ than to $Na^+$, would measure $K^+$ in solutions of equal $Na^+$ and $K^+$ activities, with a less than 20% error, which is tolerable in some applications. In the presence of a 10 fold excess of $K^+$ over $Na^+$, the same electrode will measure with a less than 2% error. An example of a glass composition for such an electrode is KAS 22.7–8.4 (22.7 mole percent $K_2O$, 8.4 mole percent $Al_2O_3$, remainder $SiO_2$). This glass, aside from being 5 times more sensitive to $K^+$ than to $Na^+$ is also 40 times more sensitive to $K^+$ as to $Li^+$, equally sensitive to $K^+$ as to $NH_4^+$ and ¼ as sensitive to $K^+$ as to $H^+$ (which means that it is insensitive to $H^+$ at the usual $K^+$ and $H^+$ concentrations). Another example of such a glass composition is KAS 38.4–4.7 which is 7 times more sensitive to $K^+$ than $Na^+$, 75 times more sensitive to $K^+$ than $Li^+$, equally sensitive to $K^+$ as to $NH_4^+$ and ½ as sensitive to $K^+$ as to $H^+$ (which means that it is insensitive to $H^+$ at the usual $K^+$ and $H^+$ concentrations). If one knows the $Na^+$ activity, then the above errors are reduced to a negligible amount by the use of the equation which follows. The knowledge of $Na^+$ activity may be obtained through the use of sodium selective electrodes as disclosed in our Patent No. 2,829,-090 or our co-pending application Serial No. 854,153 or by other known means, such as a flame photometer.

As stated in our patent, in mixtures of any two univalent cations, the glass electrode potential is governed by the following empirical formula:

(1)
$$E = E^0 + \frac{RT}{F} \ln [(A^+)^{1/M_{AB}} + k_{AB}^{1/M_{AB}}(B^+)^{1/M_{AB}}]^{M_{AB}}$$

wherein:
$E$ = measured E.M.F.
$E^0$ = standard potential
$R$ = ideal gas equation constant
$T$ = temperature (absolute)
$F$ = Faraday constant
$(A^+)$ and $(B^+)$ = activity of the ionic species $A^+$ and $B^+$
$M_{AB}$ and $k_{AB}$ = empirical constants for a given glass composition and ionic pair $A^+$ and $B^+$ In the case of $H^+$—$Na^+$ mixtures, $M_{HNa}$ generally equals 1 at any fixed pH in mixtures of $Na^+$—$K^+$, $M_{NaK}$ generally equals 1 for the present glasses. Since for practical purposes the activity of $H^+$ can be neglected, above pH 5.6, the aforementioned generalized equation, as applied to mixtures of $Na^+$, $K^+$ and $H^+$, reduces to the following:

(2) $$E = E^0 + \frac{RT}{F} \ln [(Na^+) + k_{NaK}(K^+)]$$

The term sensitivity of $Na^+$ to $K^+$ as used herein refers to $k_{NaK}$.

When measuring K activity in mixtures of Na and K at a particular pH with the present electrodes, we use Equation 2. At an appropriate pH, measure the potentials of a 0.1 N solution of $Na^+$ and a 0.1 N solution of $K^+$ using the instant electrode to calculate the value of $k_{NaK}$ and $E^0$. Then measure the potential of the unknown solution. Employing Equation 2 one can either insert the value of $Na^+$, known or measured by some means as aforesaid, and solve for $K^+$. Or, for extreme precision one can solve simultaneously the equations for the potentials of the unknown mixture, measured on the one hand with an $Na^+$ sensitive electrode and on the other hand with a $K^+$ sensitive electrode using the values of $E^0$ and $k_{NaK}$ for these electrodes.

It should be understood that the property of high potassium selectivity relative to sodium is a function only of the $Al_2O_3$:$K_2O$ ratio as specified above regardless of the presence or absence of any other oxides in the glass (except, for example, large amounts of $Na_2O$ and $Li_2O$). Hence, the network forming oxide $SiO_2$ may be partially or totally replaced by $GeO_2$ and oxides such as $MgO$, $CaO$, $BaO$, $SrO$, $CuO$, $Fe_2O_3$ and $B_2O_3$ can be added up to several mole percent as can also even other alkali metal oxides in small amounts to improve the physical properties of the glass without importantly affecting the potassium sensitivity of the electrode.

The glass electrode of the instant invention is employed in conventional pH equipment which is shown diagrammatically in the accompanying drawing. It is the active portion (bulb or membrane) 10 of the conventional electrode 12 which is made of the aforedescribed glass compositions. The electrode is operatively connected to a standard half-cell 14, such as saturated KCl-calomel, via conventional high impedance, high gain electrometric amplification equipment 16. The instrument may be calibrated with known solutions containing mixtures of $H^+$, $Na^+$ and $K^+$ cations and the $K^+$ ion concentration of unknown solutions can then be measured directly by subjecting the glass and reference electrode to the unknown solutions. The electrodes are indifferent to the particular anion present, such as chloride, hydroxyl, bicarbonate, nitrate, acetate, carbonate, sulphate, thiosulphate, ferrocyanide and ferricyanide. Nor are they affected by the presence of oxidizing or reducing substances. They are also insensitive to divalent and more highly charged cations except when these are present in unusual quantities.

We claim:

1. A glass electrode for selectively measuring potassium ion activity in ionic mixtures including the sodium and hydrogen ions, said electrode having an active portion made of a composition consisting essentially of an alkali oxide selected from the class consisting of potassium oxide, rubidium oxide and cesium oxide, aluminum oxide and a network forming oxide in which the ratio of the mole percent of alkali oxide to aluminum oxide is at least substantially 1.5 to 1.

2. A glass electrode for selectively measuring potassium ion activity in ionic mixtures including the sodium and hydrogen ions, said electrode having an active portion made of a composition consisting essentially of potassium oxide, aluminum oxide and a network forming oxide selected from the class consisting of $SiO_2$ and $GeO_2$ in which the ratio of the mole percent of $K_2O$ to $Al_2O_3$ is at least substantially 1.5 to 1.

3. A process of selectively measuring potassium ion activity in an ionic mixture including the sodium and hydrogen ions comprising providing an electrode whose active portion is made of a composition consisting essentially of an alkali oxide selected from the class consisting of potassium oxide, rubidium oxide and cesium oxide, aluminum oxide and a network forming oxide in which the ratio of the mole percent of alkali oxide to aluminum oxide is at least substantially 1.5 to 1, subjecting the mixture to said electrode and to a standard reference half-cell and operatively connecting the glass electrode and reference half-cell to a high impedance electrometric amplifier.

4. A process of selectively measuring potassium ion activity in an ionic mixture including the sodium and hydrogen ions comprising providing an electrode whose active portion is made of a composition consisting essentially of potassium oxide, aluminum oxide and a network forming oxide selected from the class consisting of $SiO_2$ and $GeO_2$ in which the ratio of the mole percent of $K_2O$ to $Al_2O_3$ is at least substantially 1.5 to 1, subjecting the mixture to said electrode and to a standard reference half-cell and operatively connecting the glass electrode and reference half-cell to a high impedance electrometric amplifier.

5. A process of selectively measuring potassium ion activity in an ionic mixture including the sodium and hydrogen ions comprising measuring the potential of the unknown mixture using a sodium sensitive glass electrode, measuring the potential of the unknown mixture using a glass electrode whose active portion is made of a composition consisting essentially of potassium oxide, aluminum oxide and a network forming oxide selected from the class consisting of $SiO_2$ and $GeO_2$ in which the ratio of the mole percent of $K_2O$ to $Al_2O_3$ is at least substantially 1.5 to 1, and calculating the activity of $K^+$ from simultaneous equations of the form:

$$E = E^0 + \frac{RT}{F} \ln\left[(Na^+) + k_{NaK}(K^+)\right]$$

wherein:

$E$ = measured potential for electrode
$E^0$ = standard potential for each electrode
$R$ = ideal gas equation constant
$T$ = absolute temperature
$F$ = Faraday constant
$k_{NaK}$ = empirical constant for the glass composition of each electrode
$(Na^+)$ and $(K^+)$ = activities of $Na^+$ and $K^+$ 6. A process of selectively measuring potassium ion activity in an ionic mixture including sodium and hydrogen ions comprising measuring the activity of $Na^+$ in the unknown mixture, measuring the potential of the unknown mixture using a glass electrode whose active portion is made of a composition consisting essentially of potassium oxide, aluminum oxide and a network forming oxide selected from the class consisting of $SiO_2$ and $GeO_2$ in which the ratio of the mole percent of $K_2O$ to $Al_2O_3$ is at least substantially 1.5 to 1, and solving the following equation for $K^+$, after inserting the activity of $Na^+$ therein:

$$E = E^0 + \frac{RT}{F} \ln\left[(Na^+) + k_{NaK}(K^+)\right]$$

wherein:

$E$ = measured potential for electrode
$E^0$ = standard potential for each electrode
$R$ = ideal gas equation constant
$T$ = absolute temperature
$F$ = Faraday constant
$k_{NaK}$ = empirical constant for the glass composition of each electrode
$(Na^+)$ and $(K^+)$ = activities of $Na^+$ and $K^+$ References Cited in the file of this patent

UNITED STATES PATENTS

| | | |
|---|---|---|
| 2,462,843 | Cary et al. | Mar 1, 1949 |
| 2,829,090 | Eisenman et al. | Apr. 1, 1958 |

OTHER REFERENCES

Eisenman et al.: "Science," volume, 126 (Oct. 25, 1957), pages 831–834. Copy in Scientific Library.